US007143305B2

(12) United States Patent
Hajji et al.

(10) Patent No.: US 7,143,305 B2
(45) Date of Patent: Nov. 28, 2006

(54) USING REDUNDANT SPARES TO REDUCE STORAGE DEVICE ARRAY REBUILD TIME

(75) Inventors: Amine M. Hajji, San Jose, CA (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/607,118

(22) Filed: Jun. 25, 2003

(65) Prior Publication Data
US 2005/0015653 A1 Jan. 20, 2005

(51) Int. Cl.
*G06F 11/00* (2006.01)
(52) U.S. Cl. .............................................. 714/2; 714/6
(58) Field of Classification Search .................... 714/6, 714/7, 15
See application file for complete search history.

(56) References Cited

U.S. PATENT DOCUMENTS

| | | | | |
|---|---|---|---|---|
| 5,208,813 A | * | 5/1993 | Stallmo | 714/7 |
| 5,258,984 A | * | 11/1993 | Menon et al. | 714/7 |
| 5,313,626 A | * | 5/1994 | Jones et al. | 714/5 |
| 5,412,661 A | * | 5/1995 | Hao et al. | 714/6 |
| 5,522,031 A | * | 5/1996 | Ellis et al. | 714/6 |
| 5,611,069 A | | 3/1997 | Matoba | |
| 5,623,595 A | * | 4/1997 | Bailey | 714/6 |
| 5,657,439 A | | 8/1997 | Jones et al. | |
| 5,680,539 A | * | 10/1997 | Jones | 714/6 |
| 5,701,407 A | * | 12/1997 | Matsumoto et al. | 714/7 |
| 5,764,880 A | * | 6/1998 | Gerdt et al. | 714/7 |
| 5,778,167 A | * | 7/1998 | Carrel et al. | 714/8 |
| 5,812,753 A | * | 9/1998 | Chiariotti | 714/6 |
| 5,848,230 A | | 12/1998 | Walker | |
| 5,872,000 A | * | 2/1999 | Yu | 435/252.3 |
| 5,889,938 A | * | 3/1999 | Tanaka et al. | 714/47 |
| 5,941,994 A | | 8/1999 | DeKoning et al. | |
| 5,951,691 A | * | 9/1999 | Ng et al. | 714/5 |
| 5,951,693 A | | 9/1999 | Walton et al. | |
| 5,961,652 A | * | 10/1999 | Thompson | 714/6 |
| 6,000,039 A | * | 12/1999 | Tanaka et al. | 714/6 |
| 6,092,215 A | * | 7/2000 | Hodges et al. | 714/6 |
| 6,154,853 A | * | 11/2000 | Kedem | 714/6 |

(Continued)

OTHER PUBLICATIONS

Chen, M, Hsiao, H., and Yu, P.S., "Optimal Data Allotment to Build High Availability and High Performance Disk Arrays", IBM Technical Disclosure Bulletin, May 1994, pp. 75-80, vol. 37, No. 05, IBM Corp.

(Continued)

*Primary Examiner*—Robert Beausoliel
*Assistant Examiner*—Amine Riad
(74) *Attorney, Agent, or Firm*—Timothy N. Ellis (57) ABSTRACT

A method for replacing a failed storage device in a storage device array includes detecting that the storage device has failed, and reconstructing data that was stored on the failed storage device. The method also includes commencing writing the reconstructed data on each of a plurality of spare storage devices, without verifying that the reconstructed data is successfully written, and finishing writing the reconstructed data on at least one of the spare storage devices. The method further includes beginning validating that the reconstructed data was successfully written, on each of the spare storage devices that the writing was finished on. A write complete message indicating that the reconstructed data was successfully written is received from at least one of the spare storage devices, and, a spare storage device from which a write complete message was received is accepted into the storage device array to replace the failed storage device.

28 Claims, 3 Drawing Sheets

U.S. PATENT DOCUMENTS

| | | |
|---|---|---|
| 6,247,152 B1 * | 6/2001 | Russell .................. 714/718 |
| 6,272,442 B1 | 8/2001 | Jeffries |
| 6,418,539 B1 | 7/2002 | Walker |
| 6,425,052 B1 | 7/2002 | Hashemi |
| 6,516,425 B1 * | 2/2003 | Belhadj et al. ............ 714/6 |
| 6,976,187 B1 * | 12/2005 | Arnott et al. ............. 714/5 |
| 2002/0124137 A1 | 9/2002 | Ulrich et al. |
| 2002/0138559 A1 | 9/2002 | Ulrich et al. |

OTHER PUBLICATIONS

"Method and means for enhanced data scrubbing of RAID 0, and 5 arrays", Research Disclosure, Mar. 2000, p. 551, No. 431, 431137.

* cited by examiner

USING REDUNDANT SPARES TO REDUCE STORAGE DEVICE ARRAY REBUILD TIME

BACKGROUND

1. Technical Field

The present invention relates to replacing failed storage devices. More particularly, the invention concerns using redundant spare storage devices to reduce the rebuild time when replacing a failed storage device in a storage device array.

2. Description of Related Art

Important data is frequently stored in storage devices, such as hard disk drives, used in computing systems. Consequently, it is desirable to reduce the probability of data being lost if a storage device fails.

Techniques that have been utilized to reduce the probability of data being lost when a storage device fails include storing parity information on another storage device, and making a duplicate copy of data on another storage device (data mirroring). If a storage device fails, parity information may be used to reconstruct the data that was on the failed storage device. If data mirroring is used, a duplicate copy of data that was on the failed storage device can be retrieved from another storage device.

A Redundant Array of Inexpensive (or Independent) Disks (RAID), may be used to provide a data storage system that has increased performance and capacity. Data mirroring and parity information storage may be implemented on a RAID. Also, a technique called striping, in which data (and possibly parity information) is divided into blocks and is stored on different disks, may be used with a RAID to balance the load across the disks and to improve performance. Several RAID protocols have been devised wherein different mirroring, parity, and striping arrangements are employed. As an example, in RAID 5, data and parity information are striped across a number of disks. RAID 5 provides a redundancy of one, which means that data can be recovered after the failure of one storage device.

For storage systems that have a redundancy of one, there is a period of time, referred to as a single point of failure time window, during which the data on the entire array can be lost if a second storage device fails. The single point of failure time window begins when a storage device in a storage array fails, and continues for the time required to reliably rebuild the data that was stored on the failed storage device, on a spare storage device. In a similar but less extreme data loss scenario, a sector of data can be lost if any surviving storage device or the spare storage device suffers an unrecoverable read error during the rebuild time. For storage systems that have a redundancy of two, a single point of failure time window begins if two storage devices are simultaneously in a failed condition.

The probability of data being lost due to a subsequent storage device failure during a rebuild during a single point of failure time window, is proportional to the time required for the rebuild. Accordingly, it is desirable to reduce the rebuild time. Generally, larger drives take longer to rebuild than smaller drives. The time required for a rebuild may be, for example, as long as several hours. Many of the techniques currently employed when rebuilding data on a spare disk prolong the rebuild time. For example, write verify operations extend the time required to complete a rebuild. Also, with known rebuild techniques, data is written to only a single spare disk, which can result in delay if there is an error while writing to the spare disk. Consequently, current rebuild techniques are not completely adequate.

SUMMARY

One aspect of the invention is a method for replacing a failed storage device in a storage device array. An example of the method includes detecting that the storage device in the storage device array has failed, and reconstructing data that was stored on the failed storage device. The method also includes commencing writing the reconstructed data on each spare storage device in a plurality of spare storage devices, wherein the reconstructed data is written on the plurality of spare storage devices without verifying that the reconstructed data is successfully written. The method also includes finishing writing the reconstructed data on at least one of the spare storage devices in the plurality of spare storage devices. The method further includes beginning validating that the reconstructed data was successfully written, on each of the spare storage devices on which writing of the reconstructed data is finished. A write complete message is received from at least one of the spare storage devices, indicating that the reconstructed data was successfully written. A spare storage device from which a write complete message was received is accepted into the storage device array to replace the failed storage device.

Other aspects of the invention are described in the sections below, and include, for example, a storage apparatus, and a signal bearing medium tangibly embodying a program of machine-readable instructions executable by a digital processing apparatus to perform a method for replacing a failed storage device in a storage device array.

The invention provides a number of advantages. For example, the invention advantageously reduces the probability of data being lost after the failure of a storage device in a storage device array, by reducing the time required to rebuild the data on a spare storage device. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

I. Hardware Components and Interconnections

One aspect of the invention is a storage system that uses redundant spare storage devices to reduce the rebuild time when replacing a failed storage device in a storage device array. As an example, the storage system may be embodied by the hardware components and interconnections of the multi-server storage system 100 shown in FIG. 1. The storage system 100 could be implemented, for example, in a model 2105-800 Enterprise Storage Server, manufactured by International Business Machines Corporation. As an example, the storage system 100 may be used for processing and storing data for banks, governments, large retailers, or medical care providers.

The storage system 100 includes a first cluster 102, and a second cluster 104. In alternative embodiments, the storage system 100 may have a single cluster or more than two clusters. Each cluster has at least one processor. As an example, each cluster may have four or six processors. In the example shown in FIG. 1, the first cluster 102 has six processors 106a, 106b, 106c, 106d, 106e, and 106f, and the second cluster 104 also has six processors 108a, 108b, 108c, 108d, 108e, and 108f. Any processors having sufficient computing power can be used. As an example, each processor 106a–f, 108a–f, may be a PowerPC RISC processor, manufactured by International Business Machines Corporation. The first cluster 102 also includes a first memory 110, and similarly, the second cluster 104 includes a second memory 112. As an example, the memories 110, 112, may be called fast access storage, and may be RAM. The memories 110, 112 may be used to store, for example, data, and application programs and other programming instructions executed by the processors 106a–f, 108a–f. The two clusters 102, 104 may be located in a single enclosure or in separate enclosures. In alternative embodiments, each cluster 102, 104 could be replaced with a supercomputer, a mainframe computer, a computer workstation, and/or a personal computer.

Figure 1:
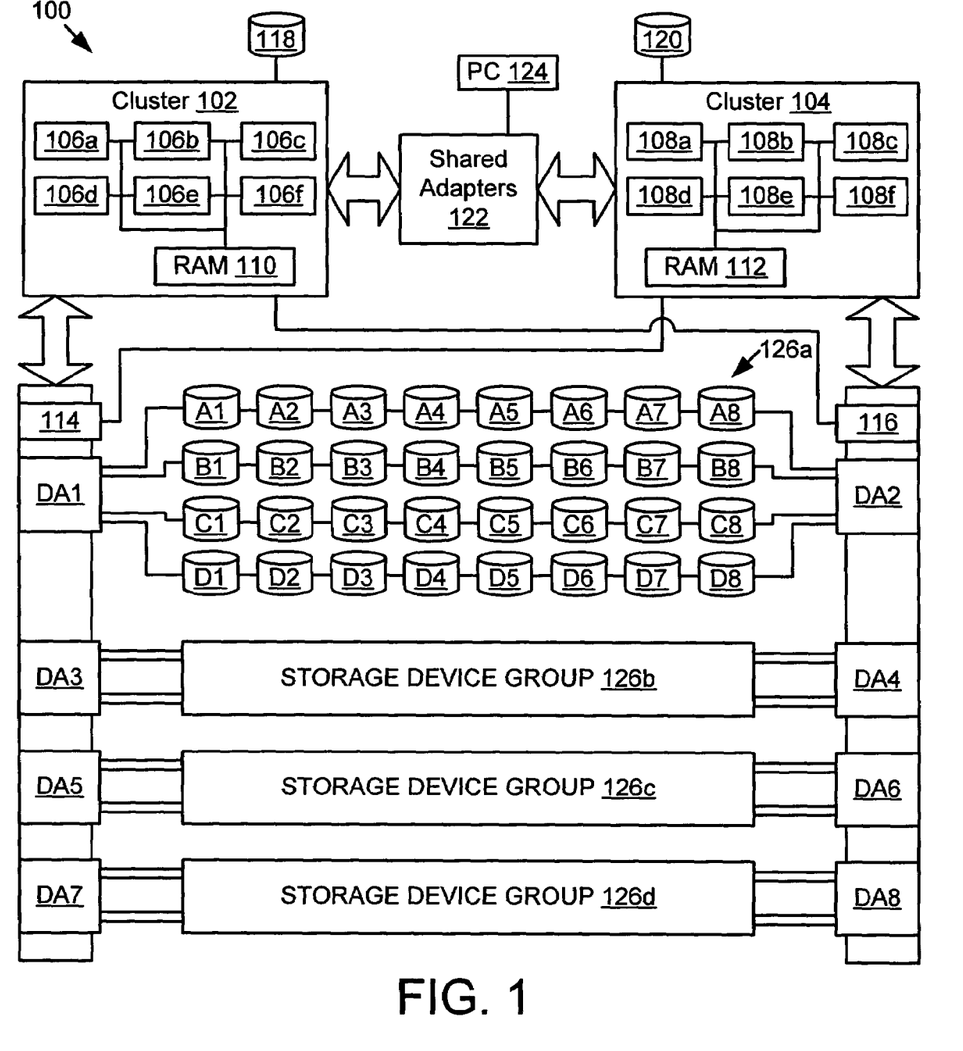
FIG. 1 is a block diagram of the hardware components and interconnections of a computing system in accordance with an example of the invention.

The first cluster 102 is coupled to NVRAM 114 (non-volatile random access memory), which is included with a first group of device adapters DA1, DA3, DA5, DA7 (discussed below). Similarly, the second cluster 104 is coupled to NVRAM 116, which is included with a second group of device adapters DA2, DA4, DA6, DA8 (discussed below). Additionally, the first cluster 102 is coupled to the NVRAM 116, and the second cluster 104 is coupled to the NVRAM 114. As an example, data operated on by cluster 102 is stored in memory 110, and is also stored in NVRAM 116, so that if cluster 102 becomes unoperational, the data will not be lost and can be operated on by cluster 104. Similarly, as an example, data operated on by cluster 104 is stored in memory 112, and is also stored in NVRAM 114, so that if cluster 104 becomes unoperational, the data will not be lost and can be operated on by cluster 102. The NVRAM 114, 116 may, for example, be able to retain data for up to about 48 hours without power.

Within the first cluster 102, two or more of the processors 106a–f may be ganged together to work on the same tasks. However, tasks could be partitioned between the processors 106a–f. Similarly, within the second cluster 104, two or more of the processors 108a–f may be ganged together to work on the same tasks. Alternatively, tasks could be partitioned between the processors 108a–f. With regard to the interaction between the two clusters 102, 104, the clusters 102, 104 may act on tasks independently. However, tasks could be shared by the processors 106a–f, 108a–f in the different clusters 102, 104.

The first cluster 102 is coupled to a first boot device, for example first hard drive 118. Similarly, the second cluster 104 is coupled to a second boot device, for example second hard drive 120.

Each of the clusters 102, 104 is coupled to shared adapters 122, which are shared by the clusters 102, 104. The shared adapters 122 can also be called host adapters. The shared adapters 122 may be, for example, PCI slots, and bays hooked to PCI slots, which may be operated by either cluster 102, 104. As an example, the shared adapters 122 may be SCSI, ESCON, FICON, or Fiber Channel adapters, and may facilitate communications with PCs and/or other hosts, such as PC 124.

Additionally, the first cluster 102 is coupled to a first group of device adapters DA1, DA3, DA5, DA7, (which may also be called dedicated adapters), and the second cluster 104 is coupled to a second group of device adapters DA2, DA4, DA6, DA8. Each of the device adapters DA1, DA3, DA5, DA7 is an interface between the first cluster 102 and one of the storage device groups 126a, 126b, 126c, 126d, and similarly, each of the device adapters DA2, DA4, DA6, DA8 is an interface between the second cluster 104 and one of the storage device groups 126a, 126b, 126c, 126d. More specifically, device adapters DA1 and DA2 are coupled to storage device group 126a, device adapters DA3 and DA4 are coupled to storage device group 126b, device adapters DA5 and DA6 are coupled to storage device group 126c, and device adapters DA7 and DA8 are coupled to storage device group 126d. In other embodiments, larger or smaller numbers of device adapters DA1–8, and storage device groups 126a–d could be used. The storage device groups 126a–d are shared by the clusters 102, 104. In an alternative embodiment, one or more of the storage device groups could be at a different site than the first cluster 102 and the second cluster 104.

In one embodiment, each device adapter DA1–8 is a Serial Storage Architecture (SSA) adapter. Alternatively other types of adapters, for example SCSI or Fiber Channel adapters, could be used for one or more of the device adapters DA1–8.

Each pair of device adapters (DA1 and DA2, DA3 and DA4, DA5 and DA6, DA7 and DA8), is coupled to two loops of storage devices. For example, device adapters DA1 and DA2 are coupled to a first loop of storage devices that includes a first string of storage devices A1, A2, A3, A4, A5, A6, A7, A8, and a second string of storage devices B1, B2, B3, B4, B5, B6, B7, B8. The first and second strings of storage devices in a loop will usually have the same number of storage devices, to keep the loop balanced. Similarly, device adapters DA1 and DA2 are also coupled to a second loop of storage devices that includes a first string of storage devices C1, C2, C3, C4, C5, C6, C7, C8, and a second string of storage devices D1, D2, D3, D4, D5, D6, D7, D8. A collection of eight storage devices such as storage devices A1, A2, A3, A4, A5, A6, A7, and A8 may be referred to as an 8-pack. Although not required, a loop will generally have a minimum of sixteen storage devices. In alternative embodiments, larger or smaller numbers of storage devices could be included in each loop. For example, thirty-two, forty-eight, or other numbers of storage devices could be included in each loop. Usually, the strings of storage devices in a loop have equal numbers of storage devices. Each loop of storage devices forms a serial loop with each device adapter that the loop of storage devices is coupled to. For example, the loop of storage devices that includes storage devices A1, A2, A3, A4, A5, A6, A7, A8, and B1, B2, B3, B4, B5, B6, B7, B8 forms a serial loop with device adapter DA1, and also forms a serial loop with device adapter DA2. This arrangement increases reliability because each serial loop provides redundant communication paths between each storage device in the loop and each device adapter coupled to the loop.

The storage devices within each group of storage devices 126a, 126b, 126c, 126d may be grouped into one or more storage device arrays, each of which may be, for example, a Redundant Array of Inexpensive (or Independent) Disks (RAID). RAID arrays may also be called RAID ranks.

Responsive to read and write requests received from the first and second clusters 102, 104, the device adapters DA1–8 are able to individually address each storage device in the RAID arrays to which they are coupled. The storage devices in a particular RAID array may be in the same loop, or in different loops, between a pair of device adapters. As an example where RAID arrays are made from storage devices that are in a single loop, a first RAID array may include storage devices A1, A2, A3, A4, B1, B2, and B3, and a second RAID array may include storage devices A6, A7, A8, B5, B6, B7, and B8, with storage devices B4 and A5 designated as spares that can be used by either RAID array. In this example, each RAID array includes storage devices from the A1, A2, A3, A4, A5, A6, A7, A8, 8-pack, and from the B1, B2, B3, B4, B5, B6, B7, B8, 8-pack, so that each RAID array is close to one of the device adapters DA1, DA2. As an example where RAID arrays are made from storage devices that are in different loops, a first RAID array may include storage devices A1, A2, B1, B2, C1, C2, and D1, a second RAID array may include storage devices A3, A4, B3, B4, C3, D3, and D4, a third RAID array may include storage devices A5, A6, B6, C5, C6, D5, and D6, and a fourth RAID array may include storage devices A8, B7, B8, C7, C8, D7, and D8, with storage devices D2, C4, B5, and A7 designated as spares that can be used by any of the four RAID arrays. In these examples, RAID arrays and spare storage devices that are available for the RAID arrays, are coupled to the same pair of device adapters. However, a RAID array, and spare storage devices that are available for the RAID array, could be coupled to different pairs of device adapters. Also, a RAID array and spare storage devices that are available for the RAID array may be in a single loop, or in different loops.

Data, and if desired, parity information, may be stored on the storage devices of a RAID array in any desired arrangement, which may include striping and/or mirroring across all, or some, of the storage devices in a RAID array. As an example, six storage devices in a RAID array may be used to store data, and a seventh storage device in the RAID array may be used to store parity information. In another example, seven storage devices in a RAID array may be used to store data, and an eighth storage device in the RAID array may be used to store parity information. As another example, both data and parity information may be stored on all of the storage devices in a RAID array. In other embodiments RAID arrays could have less than seven, or more than eight storage devices. For example, a RAID array could consist of six storage devices that are each used to store both data and parity information. Also, double parity information may be stored to permit recovery from a second storage device failure that occurs before completing a rebuild after a first storage device failure. For example, a RAID array could consist of six storage devices that are used to store data, and two storage devices that are used to store parity information. As another example, seven storage devices could be used for data, another seven storage devices could be used to mirror the data on the first seven storage devices, and two more storage devices could be used to store parity information, which all together could provide for recovery from the failure of nine storage devices (a failure tolerance of nine).

The storage devices in the storage device groups 126a–d generally may be any suitable devices for storing data, and may use magnetic, optical, magneto-optical, electrical, or any other suitable technology for storing data. For example, the storage devices could be hard disk drives, optical disks or discs (for example, CD-R, CD-RW, WORM, DVD-R, DVD+R, DVD-RW, or DVD+RW), floppy disks, magnetic data storage disks or diskettes, magnetic tape, digital optical tape, EPROMs, EEPROMs, or flash memory. The storage devices do not each have to be the same type of device or use the same type of technology. As an example, each storage device may be a hard drive with any desired capacity. Exemplary capacities of hard drives that may be used are 36 Giga Bytes and 146 Giga Bytes. In one example, each storage device group 126a–d may be a storage enclosure in a model 2105 Enterprise Storage Server, manufactured by International Business Machines Corporation.

The first cluster 102 and/or the second cluster 104 together with at least one device adapter DA1–8 and at least one storage device group 126a–d may be referred to as a storage system or storage apparatus.

II. Operation

In addition to the various hardware embodiments described above, a different aspect of the invention concerns a method for replacing a failed storage device.

A. Signal-Bearing Media

In the context of FIG. 1, such a method may be implemented, for example, by operating one or more of the processors 106a–f, 108a–f in the clusters 102, 104, to execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for replacing a failed storage device.

Figure 2:
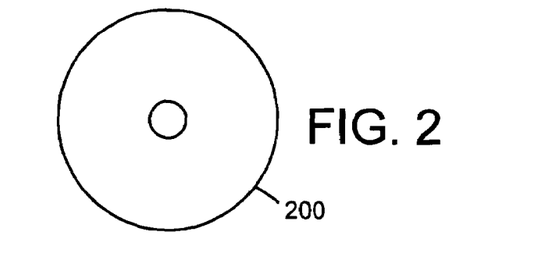
FIG. 2 is an example of a signal-bearing medium in accordance an example of the invention.

This signal-bearing medium may comprise, for example, the first hard drive 118, the second hard drive 120, memory 110, memory 112, and/or one or more storage devices in the storage device groups 126a–d. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Whether contained in the storage system 100 or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

B. Overall Sequence of Operation

For ease of explanation, but without any intended limitation, the method aspect of the invention is described with reference to the storage system 100 described above. The method may also be practiced with the first cluster 102, and/or the second cluster 104, in conjunction with one or more device adapters DA1–8 and one or more storage device groups 126a–d, or with any other suitable storage system.

Figure 3A:
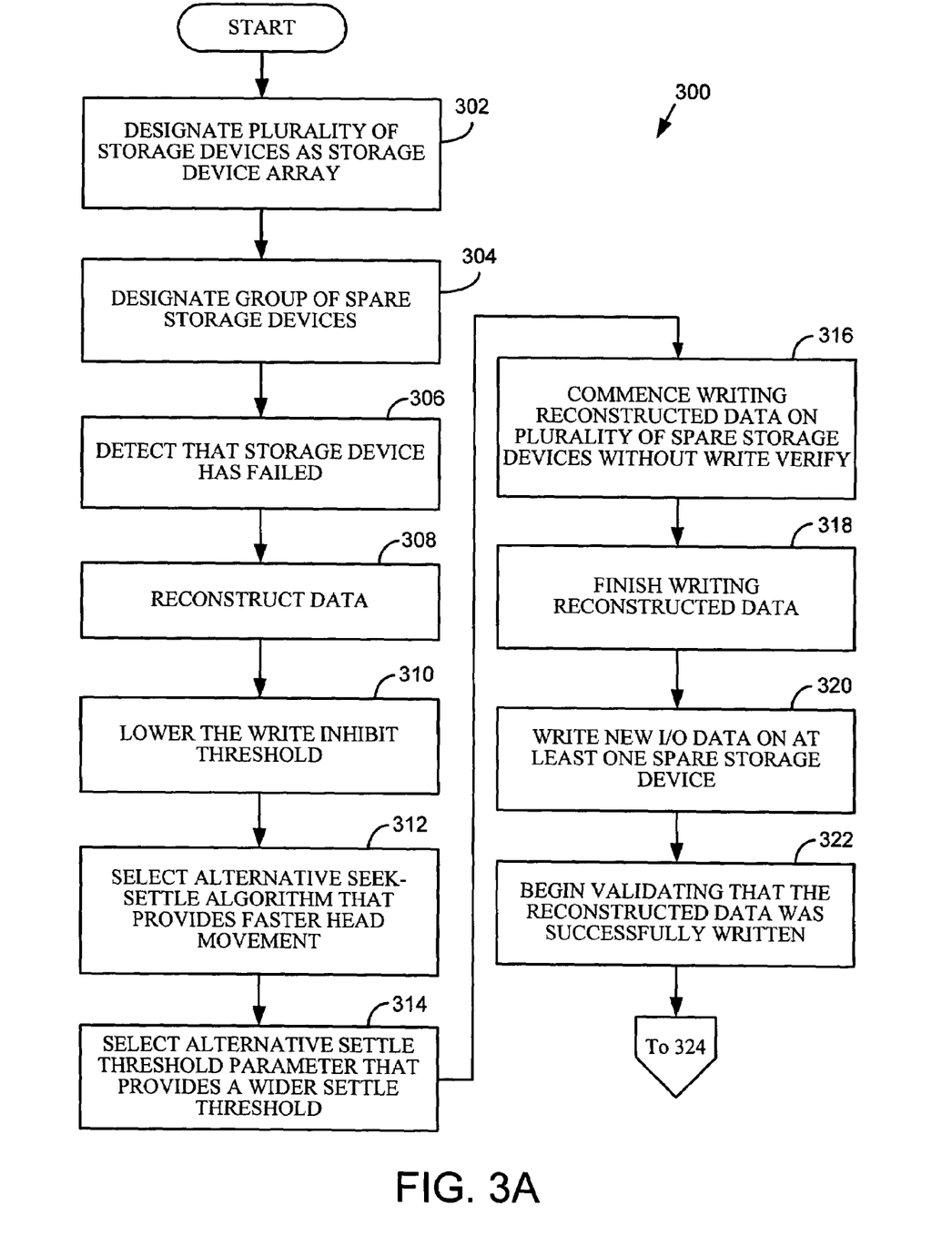
FIGS. 3A and 3B are a flowchart of an operational sequence for replacing a failed storage device in a storage device array in accordance with an example of the invention.
Figure 3B:
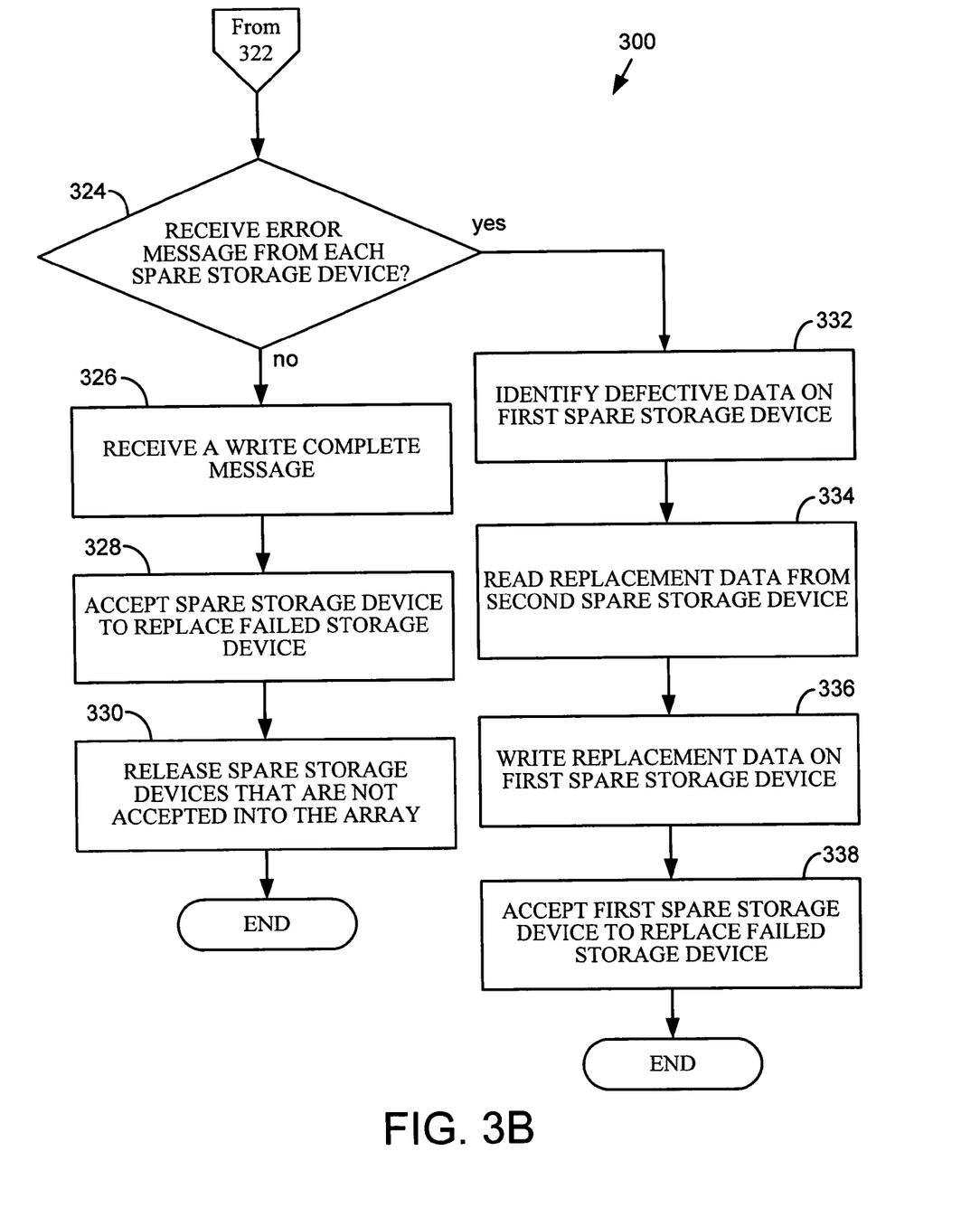

An example of the method aspect of the present invention is illustrated in FIGS. 3A and 3B, which show a sequence 300 for a method for replacing a failed storage device in an array of storage devices. The sequence 300 may include, and begin with, operation 302 which comprises designating a plurality of storage devices as the storage device array. The sequence 300 may also include operation 304, which comprises designating a group of spare storage devices for the storage device array, wherein the group of spare storage devices includes at least a plurality of spare storage devices. As an example, a RAID array and spare storage devices that are available to the RAID array may be in the same loop. Alternatively, the RAID array and spare storage devices that are available to the RAID array may be in different loops. Also, a RAID array and spare storage devices that are available to the RAID array may be coupled to the same, or to different, pairs of device adapters DA1–8. In one example the plurality of spare storage devices is two spare storage devices.

The sequence 300 includes operation 306, which comprises detecting that the failed storage device in the storage device array has failed. As an example, the clusters 102, 104, or device adapters DA1–8 may detect a drive failure by detecting that a drive is not responding, or that a drive is taking too long to respond, or that a drive is producing a quantity of errors that is over an error threshold. As a result of the detection that a storage device has failed, the storage device array that contains the failed storage device is placed in a rebuild mode. In alternative embodiments, the failed storage device does not have to be in a storage device array, and in that case rather than placing a storage device array in a rebuild mode, the failed storage device and associated spare storage devices are placed in a rebuild mode.

Storage systems that have redundancies of more than one may be rebuilt without losing data even if more than one storage device is in a failed condition at the same time, as long as an additional storage device does not fail during any time that a storage system is in a single point of failure time window. Examples of storage systems that have redundancies of more than one include storage systems that have two or more storage devices for storing mirrored data, and storage systems that store double (or more) parity information. The invention may be used to rebuild an array after the failure of one or more storage devices.

In operation 308, data that was stored on the failed storage device is reconstructed. As an example, an algorithm may be used to reconstruct the data from parity information, and the data may be reconstructed in RAM, or directly onto storage devices.

The sequence 300 may also include additional operations that reduce the rebuild time, such as operation 310, wherein the write inhibit threshold for the plurality of spare storage devices is lowered. The lowered write inhibit threshold may be customer specific, or customer adjustable. Write inhibits are implemented to prevent losing data on adjacent tracks when a recording head is positioned off track during a write, and generally occur when the recording head moves off track during a write. A write head is seldom perfectly on track, and if the head is more than a prescribed percentage off track, for example 17%, writing will be prevented. However, because a rebuild in accordance with the invention includes writing the rebuild data on a plurality of spare storage devices, there is reduced probability of data being lost on all of the plurality of spare storage devices if an off track write occurs, and consequently the write inhibit threshold can be lowered. Lowering the write inhibit threshold reduces the number of write inhibits that occur when the recording head is off track, thereby eliminating a number of time consuming latency hits that would otherwise occur when the recording head's position exceeds the normal off track threshold. As an example, a latency hit in a hard disk drive results in a delay for about the time required for one revolution of the disk in the drive, which for some drives may be about 6 nanoseconds.

Another operation that may be included to reduce the rebuild time is operation 312, which comprises selecting an alternative seek-settle algorithm for each of the plurality of spare storage devices, wherein each alternative seek-settle algorithm provides faster head movement than the head movement over the same distance when not in a rebuild mode. The alternative mechanical servo seek-settle algorithms employ an aggressive seek-settle approach for moving recording heads to target cylinders, which provides fast head movement to reduce head movement time when writing the reconstructed data on the plurality of spare storage devices. The alternative seek-settle algorithms may be tailored to approach a target cylinder and settle in a minimum time. The seek-settle algorithms used when the plurality of spare storage devices are not in a rebuild mode, and the alternative seek-settle algorithms used when the plurality of spare storage devices are in a rebuild mode, may be implemented as microcode in the spare storage devices. Different seek-settle algorithms and alternative seek-settle algorithms may be used for moving the write heads different distances. Typical seek-settle times when using the alternative seek-settle algorithms are 5 to 6 milliseconds.

Another operation that may be included to reduce the rebuild time is operation 314, which comprises selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode. When writing to a storage device, writing is prevented until the head moves to within the settle threshold, and consequently, widening the settle threshold allows writing to begin sooner. Although not required, a wide settle threshold will generally be employed with an aggressive seek-settle approach that provides fast head movement, because the fast head movement will generally produce more oscillation (also called ringing) in the movement of the head as the head settles around a target track. Different settle threshold parameters and alternative settle threshold parameters may be used for moving the write heads different distances.

The sequence 300 also includes operation 316, which comprises commencing writing the reconstructed data on each spare storage device in a plurality of spare storage devices, wherein the reconstructed data is written on the plurality of spare storage devices without verifying that the reconstructed data is successfully written. This operation may be referred to as mirroring the reconstructed data on the plurality of spare storage devices. Because the reconstructed data for each failed storage device is written on a plurality of spare storage devices, it is unnecessary to perform write verify operations, which would prolong the time required to write the reconstructed data. Hard disk drives typically employ magneto-resistive (MR) technology and separate read and write elements. Because the read and write elements are different elements, after writing, the head must be moved to read the data in a write verify operation, which requires additional time. As an example, a write verify operation may require the time needed for three revolutions of a hard disk.

Two or more failed storage devices may be replaced simultaneously, if there is sufficient parity information to reconstruct the data that was stored on the failed storage devices, and if there are at least two spare storage devices for each failed storage device so that reconstructed data from each failed storage device can be written on at least two spare storage devices.

In operation 316, write requests may be initiated to the plurality of spare storage devices substantially simultaneously. Operation 316 may further include synchronizing the heads of the plurality of spare storage devices when writing the reconstructed data on the plurality of spare storage devices. Synchronizing the heads reduces the time lag between mirrored writes to the plurality of spare storage devices. When the heads are synchronized, they will generally reach the same logical address at about the same time, and will write substantially simultaneously when given substantially simultaneous write requests.

The sequence 300 also includes operation 318, which comprises finishing writing the reconstructed data on at least one of the spare storage devices in the plurality of spare storage devices. The sequence 300 may also include operation 320, in which new I/O data is written on at least one spare storage device in the plurality of spare storage devices. For any spare storage device on which new I/O data is to be written, the new I/O data may be written during, and/or after, writing the reconstructed data on that storage device. Alternatively, for any spare storage device on which new I/O data is to be written, the new I/O data may be written instead of the reconstructed data.

The sequence 300 also includes operation 322, which comprises beginning validating that the reconstructed data was successfully written, on each of the spare storage devices on which writing of the reconstructed data is finished. Validating that the reconstructed data was successfully written can be accomplished, for example, by conducting a drive scrub or a pack scan. When a drive scrub or a pack scan is performed, the entire drive is read to verify that every sector that was written to can be read. A pack scan is a drive command, whereas a drive scrub can operate in the background.

Referring now to FIG. 3B, the sequence 300 may include operation 324, which comprises determining whether an error message is received from each of the spare storage devices on which writing of the reconstructed data is finished. If in operation 324 it is determined that an error message is not received from each of the spare storage devices on which writing of the reconstructed data is finished, then operations 326, 328, and 330 may be performed. Operation 326 comprises receiving a write complete message from at least one of the spare storage devices, indicating that the reconstructed data was successfully written. The write complete message may be generated from at least one of the spare storage devices as the result of successfully validating the data by, for example, performing a drive scrub or pack scan without error. Operation 328 comprises accepting one of the at least one spare storage devices from which a write complete message was received, into the storage device array to replace the failed storage device. As an example, a first spare storage device and a second spare storage device may each generate write complete messages, and in that case, the spare storage device that is accepted into the storage device array may be the first spare storage or the second spare storage device. In one example, the first spare storage device from which a write complete message is received is accepted into the storage device array. If there are two spare storage devices, and only one of the spare storage devices generates a write complete message, then the spare storage device that generates the write complete message is accepted into the storage device array.

The sequence 300 may also include operation 330, which comprises releasing all of the spare storage devices in the plurality of spare storage devices that are not accepted into the storage device array, so they may again be used as spare storage devices, after performing operation 328. The spare storage devices that are released may be used as spare storage devices for one or more storage device arrays.

If in operation 324 it is determined that an error message is received from each of the spare storage devices on which writing of the reconstructed data is finished, then operations 332, 334, 336 and 338 may be performed. Operation 332 comprises identifying defective data on a first one of the spare storage devices from which an error message was received. Operation 334 comprises reading replacement data from a second one of the spare storage devices from which an error message was received. If replacement data cannot be read from a second one of the spare storage devices, then the defective data is lost. In operation 336, the replacement data is written on the first one of the spare storage devices, to replace the defective data. As a result of this capability to read replacement data from one spare storage device and write the replacement data on another storage device to replace defective data, the probability of data being lost during a rebuild is proportional to the product of the probabilities of all of the spare storage devices having a defect in the same portion of the data. Consequently, the larger the number of spare storage devices that the reconstructed data is written to, the smaller the probability of data being lost during the rebuild. After operation 336, in operation 338 the first one of the spare storage devices is accepted into the storage device array to replace the failed storage device.

III. OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer program product comprising a computer readable storage medium embodying a computer readable program, wherein the computer readable program when executed on a computer causes the computer to perform a method for replacing a failed storage device, the method comprising the following operations:

reconstructing data that was stored on the failed storage device;

commencing writing the reconstructed data on each spare storage device in a plurality of spare storage devices, wherein the reconstructed data is written on the plurality of spare storage devices without verifying that the reconstructed data is successfully written;

finishing writing the reconstructed data on at least one of the spare storage devices in the plurality of spare storage devices;

beginning validating that the reconstructed data was successfully written, on each of the spare storage devices on which writing of the reconstructed data is finished;

receiving a write complete message from at least one of the spare storage devices, indicating that the reconstructed data was successfully written; and replacing the failed storage device with one of the at least one spare storage devices from which a write complete message was received.

2. The computer program product of claim 1, wherein writing the reconstructed data on the plurality of spare storage devices comprises:

initiating write requests to the plurality of spare storage devices substantially simultaneously; and synchronizing the beads of the plurality of spare storage devices so the reconstructed data is written substantially simultaneously on the plurality of spare storage devices.

3. The computer program product of claim 1, wherein the operations further comprise lowering a write inhibit threshold for the plurality of spare storage devices before commencing writing the reconstructed data on the plurality of spare storage devices.

4. The computer program product of claim 1, wherein the operations further comprise selecting an alternative seek-settle algorithm for each of the plurality of spare storage devices, wherein each alternative seek-settle algorithm provides faster head movement than the head movement over the same distance when not in a rebuild mode.

5. The computer program product of claim 1, wherein the operations further comprise selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode.

6. A computer program product comprising a computer readable storage medium having a computer readable program, wherein the computer readable program when executed on a computer causes the computer to perform a method for replacing a failed storage device in a storage device array, the method comprising the following operations:

detecting that the failed storage device in the storage device array has failed;

reconstructing data that was stored on the failed storage device;

commencing writing the reconstructed data on each spare storage device in a plurality of spare storage devices, wherein the reconstructed data is written on the plurality of spare storage devices without verifying that the reconstructed data is successfully written;

finishing writing the reconstructed data on at least one of the spare storage devices in the plurality of spare storage devices;

beginning validating that the reconstructed data was successfully written, on each of the spare storage devices on which writing of the reconstructed data is finished;

receiving a write complete message from at least one of the spare storage devices, indicating that the reconstructed data was successfully written; and accepting one of the at least one spare storage devices from which a write complete message was received, into the storage device array to replace the failed storage device.

7. The computer program product of claim 6, wherein the reconstructed data is written on each of the plurality of spare storage devices by initiating write requests to the plurality of spare storage devices substantially simultaneously.

8. The computer program product of claim 7, wherein writing the reconstructed data on the plurality of spare storage devices includes synchronizing the heads of the plurality of spare storage devices.

9. The computer program product of claim 6, wherein the operations further comprise writing new I/O data on at least one spare storage device in the plurality of spare storage devices.

10. The computer program product of claim 6, wherein the spare storage device that is accepted into the storage device array is the first spare storage device from which a write complete message is received.

11. The computer program product of claim 6, wherein the plurality of spare storage devices consists of two spare storage devices.

12. The computer program product of claim 6, wherein the operations further comprise:

designating a plurality of storage devices as the storage device array;

designating a group of spare storage devices for the storage device array, wherein the group of spare storage devices includes at least the plurality of spare storage devices; and releasing all of the spare storage devices in the plurality of spare storage devices that are not accepted into the storage device array so they may again be used as spare storage devices, after accepting into the storage device array one of the at least one spare storage devices from which a write complete message was received.

13. The computer program product of claim 6, wherein the operations further comprise lowering a write inhibit threshold for the plurality of spare storage devices before commencing writing the reconstructed data on the plurality of spare storage devices.

14. The computer program product of claim 6, wherein the operations further comprise selecting an alternative seek-settle algorithm for each of the plurality of spare storage devices, wherein each alternative seek-settle algorithm provides faster bead movement than the head movement over the same distance when not in a rebuild mode.

15. The computer program product of claim 6, wherein the operations further comprise selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode.

16. A computer program product comprising a computer readable storage medium tangibly embodying a program of machine-readable instructions executable by a digital processing apparatus to perform a method for replacing a failed storage device in a storage device array, the method comprising the following operations:

detecting the failure of the failed storage device in the storage device array;

reconstructing data that was stored on the failed storage device;

commencing writing the reconstructed data on each of a plurality of spare storage devices, wherein the reconstructed data is written on the plurality of spare storage devices without verifying that the reconstructed data is successfully written;

finishing writing the reconstructed data on at least one of the spare storage devices in the plurality of spare storage devices;

beginning validating that the reconstructed data was successfully written, on each of the spare storage devices on which writing of the reconstructed data was finished;
receiving an error message from each of the spare storage devices on which writing of the reconstructed data was finished;
identifying defective data on a first one of the spare storage devices from which an error message was received;
reading replacement data from a second one of the spare storage devices from which an error message was received;
writing the replacement data on the first one of the spare storage devices, to replace the defective data; and
accepting the first one of the spare storage devices into the storage device array to replace the failed storage device.

17. A storage apparatus, comprising:
an array of storage devices;
a plurality of spare storage devices; and
a processor coupled to the array of storage devices and the plurality of spare storage devices, wherein the processor is programmed to perform operations for replacing a failed storage device in the array of data storage devices, the operations comprising:
detecting the failure of the failed storage device in the storage device array;
reconstructing data that was stored on the failed storage device;
commencing writing the reconstructed data on each of the spare storage devices in the plurality of spare storage devices, wherein the reconstructed data is written on the plurality of spare storage devices without verifying that the reconstructed data is successfully written;
finishing writing the reconstructed data on at least one of the spare storage devices in the plurality of spare storage devices;
beginning validating that the reconstructed data was successfully written, on each of the spare storage devices on which writing of the reconstructed data was finished;
receiving a write complete message from at least one of the spare storage devices, indicating that the reconstructed data was successfully written; and
accepting a first spare storage device from which a write complete message was received, into the storage device array to replace the failed storage device.

18. The storage apparatus of claim 17, wherein the operations further comprise lowering a write inhibit threshold for the plurality of spare storage devices before commencing writing the reconstructed data on the plurality of spare storage devices.

19. The storage apparatus of claim 17, wherein the operations further comprise selecting an alternative seek-settle algorithm for each of the plurality of spare storage devices, wherein each alternative seek-settle algorithm provides faster head movement than the head movement over the same distance when not in a rebuild mode.

20. The storage apparatus of claim 19, wherein the operations further comprise selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode.

21. A storage system, comprising:
a first memory;
a first device adapter;
a storage device array coupled to the first device adapter;
a plurality of spare storage devices coupled to the first device adapter; and
a first plurality of processors coupled to the first memory and the first device adapter, wherein the first plurality of processors are programmed to perform operations for replacing a failed storage device in a storage device array, the operations comprising:
detecting the failure of the failed storage device in the storage device array;
reconstructing data that was stored on the failed storage device;
writing the reconstructed data simultaneously on each of the plurality of spare storage devices without verifying that that the reconstructed data is successfully written on the plurality of spare storage devices;
finishing writing the reconstructed data on at least one of the spare storage devices in the plurality of spare storage devices;
beginning validating that the reconstructed data was successfully written, on each of the spare storage devices on which writing of the reconstructed data is finished;
receiving a write complete message from at least one of the spare storage devices, indicating that the reconstructed data was successfully written; and
accepting a first spare storage device from which a write complete message was received, into the storage device array to replace the failed storage device.

22. The storage system of claim 21, further comprising:
a second memory;
a second device adapter coupled to the storage device array and the plurality of spare storage devices;
a second plurality of processors coupled to the second memory and the second device adapter; and
a plurality of shared adapters coupled to the first plurality of processors and the second plurality of processors.

23. The storage system of claim 22, wherein the operations further comprise:
lowering a write inhibit threshold for the plurality of spare storage devices before commencing writing the reconstructed data on the plurality of spare storage devices;
selecting an alternative seek-settle algorithm for each of the plurality of spare storage devices, wherein each alternative seek-settle algorithm provides faster head movement than the head movement over the same distance when not in a rebuild mode; and
selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode.

24. A system for reducing the rebuild time of a storage device array, comprising:
means for detecting a failed storage device in the storage device array;
means for reconstructing data that was stored on the failed storage device;
means for commencing writing the reconstructed data on each of a plurality of spare storage devices, wherein the reconstructed data is written on the plurality of spare storage devices without verifying that the reconstructed data is successfully written;

means for finishing writing the reconstructed data on at least one of the spare storage devices in the plurality of spare storage devices;

means for beginning validating that the reconstructed data was successfully written, on each of the spare storage devices on which writing of the reconstructed data is finished;

means for receiving a write complete message from at least one of the spare storage devices, indicating that the reconstructed data was successfully written; and means for accepting one of the at least one spare storage devices from which a write complete message was received, into the storage device array to replace the failed storage device.

25. A method for replacing a failed storage device in a storage device array, comprising:

detecting the failure of the failed storage device in the storage device array;

reconstructing data that was stored on the failed storage device;

commencing writing the reconstructed data on each of a plurality of spare storage devices, wherein the reconstructed data is written on the plurality of spare storage devices without verifying that the reconstructed data is successfully written;

finishing writing the reconstructed data on at least one of the spare storage devices in the plurality of spare storage devices;

beginning validating that the reconstructed data was successfully written, on each of the spare storage devices on which writing of the reconstructed data is finished;

receiving a write complete message from at least one of the spare storage devices, indicating that the reconstructed data was successfully written; and accepting one of the at least one spare storage devices from which a write complete message was received, into the storage device array to replace the failed storage device.

26. The method of claim 25, wherein writing the reconstructed data on the plurality of spare storage devices comprises:

initiating write requests to the plurality of spare storage devices substantially simultaneously; and synchronizing the heads of the plurality of spare storage devices so the reconstructed data is written substantially simultaneously on the plurality of spare storage devices.

27. The method of claim 25, further comprising writing new I/O data on the plurality of spare storage devices; and wherein the spare storage device accepted into the storage device array is the first spare storage device from which a write complete message is received.

28. The method of claim 26, further comprising:

lowering a write inhibit threshold for the plurality of spare storage devices before commencing writing the reconstructed data on the plurality of spare storage devices;

selecting an alternative seek-settle algorithm for each of the plurality of spare storage devices, wherein each alternative seek-settle algorithm provides faster head movement than the head movement over the same distance when not in a rebuild mode; and selecting an alternative settle threshold parameter in a seek-settle algorithm for each of the plurality of spare storage devices, wherein each alternative settle threshold parameter provides a wider settle threshold than the settle threshold for the same head movement distance when not in a rebuild mode.

* * * * *